(12) United States Patent
Sadler

(10) Patent No.: US 6,507,258 B1
(45) Date of Patent: Jan. 14, 2003

(54) ROTARY ACTUATORS

(75) Inventor: Gordon Henry E. Sadler, Wokingham (GB)

(73) Assignee: NMB (UK) Ltd., Berkshire (GB)

( * ) Notice: Subject to any disclaimer, the term of this patent is extended or adjusted under 35 U.S.C. 154(b) by 0 days.

(21) Appl. No.: 09/608,878

(22) Filed: Jun. 30, 2000

(30) Foreign Application Priority Data

Jul. 5, 1999 (EP) .............................. 99305321

(51) Int. Cl.[7] .............. H02K 1/22; H02K 1/12; H01F 7/00; H01F 7/08
(52) U.S. Cl. ............. 335/229; 310/257; 310/266; 310/268
(58) Field of Search ................ 310/114, 263, 310/74, 362, 268, 266, 257; 318/254; 335/225, 229, 272

(56) References Cited

U.S. PATENT DOCUMENTS

| | | | | |
|---|---|---|---|---|
| 4,034,247 A | * | 7/1977 | Wagensonner et al. | 310/164 |
| 4,620,301 A | | 10/1986 | Koide | 369/266 |
| 4,763,053 A | * | 8/1988 | Rabe | 318/254 |
| 4,810,914 A | * | 3/1989 | Karidis et al. | 310/12 |
| 4,837,474 A | * | 6/1989 | Petersen et al. | 310/254 |
| 4,970,421 A | * | 11/1990 | Kritzinger | 210/49 R |
| 4,972,109 A | * | 11/1990 | Kakizaki et al. | 310/49 A |
| 5,038,066 A | * | 8/1991 | Pawlak et al. | 310/263 |
| 5,041,935 A | * | 8/1991 | Aruga et al. | 360/106 |
| 5,145,038 A | * | 9/1992 | Kuwahara | 188/158 |
| 5,245,238 A | * | 9/1993 | Lynch et al. | 310/116 |
| 5,248,133 A | * | 9/1993 | Okamoto et al. | 267/136 |
| 5,334,899 A | * | 8/1994 | Skybyk | 310/268 |
| 5,448,117 A | * | 9/1995 | Elliott | 310/49 R |
| 5,677,581 A | * | 10/1997 | Yoshida et al. | 310/49 R |
| 5,786,649 A | * | 7/1998 | Roberts | 310/112 |
| 5,910,697 A | * | 6/1999 | Sromin et al. | 310/254 |
| 6,002,193 A | * | 12/1999 | Canini et al. | 310/268 |
| 6,031,305 A | * | 2/2000 | Satoh et al. | 310/49 R |
| 6,049,149 A | * | 4/2000 | Lin et al. | 310/68 R |
| 6,060,800 A | * | 5/2000 | Suzuki et al. | 310/49 R |
| 6,121,712 A | * | 9/2000 | Sakamoto | 310/254 |
| 6,198,182 B1 | * | 3/2001 | Bustamente et al. | 310/49 R |
| 6,229,238 B1 | * | 5/2001 | Graef | 310/156 |

FOREIGN PATENT DOCUMENTS

| | | |
|---|---|---|
| DE | 384 067 A | 1/1965 |
| DE | 92 14 383 U | 4/1994 |
| JP | 58108960 | 6/1983 |
| JP | 63310361 | 12/1988 |

* cited by examiner

*Primary Examiner*—Nestor Ramirez
*Assistant Examiner*—Julio C. Gonzalez
(74) *Attorney, Agent, or Firm*—Schulte Roth & Zabel

(57) ABSTRACT

A limited angle rotary actuator is disclosed comprising: an arcuate stator mountable on a platform, the stator being of predetermined length and predetermined radius so as to define a limited angle of rotation, the stator having a plurality of poles along its arcuate length which are energizable to alternate their polarity; and a rotor mountable on an element to be rotated at a position remote from the center of rotation of the element, the rotor comprising a number of magnetic poles.

23 Claims, 4 Drawing Sheets

ROTARY ACTUATORS

FIELD OF THE INVENTION

This invention relates to rotary actuators and more particularly, to a limited angle rotary actuator and to a means of increasing the torque output of a rotary actuator.

BACKGROUND OF THE INVENTION

Rotary actuators are needed in many engineering applications, particularly in the automotive field. Rotary actuation is usually accomplished using a geared motor. There are numerous disadvantages in using geared motors such as the undesirable noise which is produced by the gears, the number of component parts required by such a motor leading to unreliability, the need for frequent servicing and the increase in axial length caused by the need of a transmission between the motor and the part to be rotated and added bulk.

Stepper motors provide an effective means for converting digital signals into precise mechanical rotary movement. Rotary movement in discrete steps allows precise control over moving parts. However, the use of a stepper motor to carry out a precise actuation of a rotatable part over a limited angle may be undesirable given the cost and complexity of stepper motors. Lack of torque is an additional problem in conventional stepper motors.

SUMMARY OF THE INVENTION

It is an object of the present invention to provide a low cost limited angle rotary actuator which does not require gearing and which avoids the use of a conventional stepper motor.

Accordingly, one aspect of the present invention provides a limited angle rotary actuator comprising: an arcuate stator mountable on a platform, the stator being of predetermined length and having a predetermined radius so as to define a limited angle of rotation, the stator having a plurality of poles along its arcuate length which are controllably energizable to alternate their polarity; and a rotor mountable on an element to be rotated at a position remote from the center of rotation of the element, the rotor comprising a number of magnetic poles.

Preferably, the rotor comprises a first and a second rotor, the stator being located between the two rotors.

Conveniently, the rotor or each rotor comprises a permanent magnet which is magnetized into strips of poles of alternate magnetic polarity.

Advantageously, the rotor or each rotor comprises a plurality of discrete permanent magnets having poles of alternate magnetic polarity.

Preferably, the rotor or each rotor is part of an element to be rotated and is located at a position remote from the center of rotation of the element.

Conveniently, the stator is mounted to a fixed platform.

Advantageously, the stator is energizable to provide alternating poles in accordance with a conventional 2 or 4 phase energization sequence.

Preferably, the pitch of the poles of the rotor or each rotor is defined by the desired step angle.

Conveniently, the poles of the rotor or each respective rotor are located radially adjacent the poles of the stator, the profiles of the stator and the adjacent surface of the rotor or each respective rotor conforming with one another to minimize any air gap.

Advantageously, the stator has a first set of poles on one side of the stator, which side extends between the stator inner radius and the stator outer radius, and a second set of poles on an opposite side of the stator, which side extends between the stator inner radius and the stator outer radius.

Preferably, the poles of the stator are multipolar claw type stator poles.

Conveniently, the poles of the rotor or each respective rotor are located immediately adjacent the sides of the stator carrying the stator poles, the profiles of the sides of the stator and the adjacent surface of the rotor or each respective rotor conforming with one another to minimize any air gap.

Advantageously, the stator comprises a pair of stators.

Preferably, the stator or each stator comprises an arcuate core provided with a winding and sandwiched between two arcuate stator plates carrying the stator poles.

Another aspect of the present invention provides a rotary actuator comprising: a rotor mountable on an element to be rotated, the rotor comprising a first and a second rotor each provided with a number of magnetic poles; and an arcuate stator mountable on a platform, the stator having a plurality of poles along its arcuate length which are controllably energizable to alternate their polarity and drive the rotor, wherein the stator is located between the first and the second rotors and the stator poles on one side of the stator are adjacent the poles of the first rotor and the stator poles on the other side of the stator are adjacent the poles of the second rotor.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation in the figures of the accompanying drawings in which like references denote like or corresponding parts, and in which.

DETAILED DESCRIPTION

Figure 1:
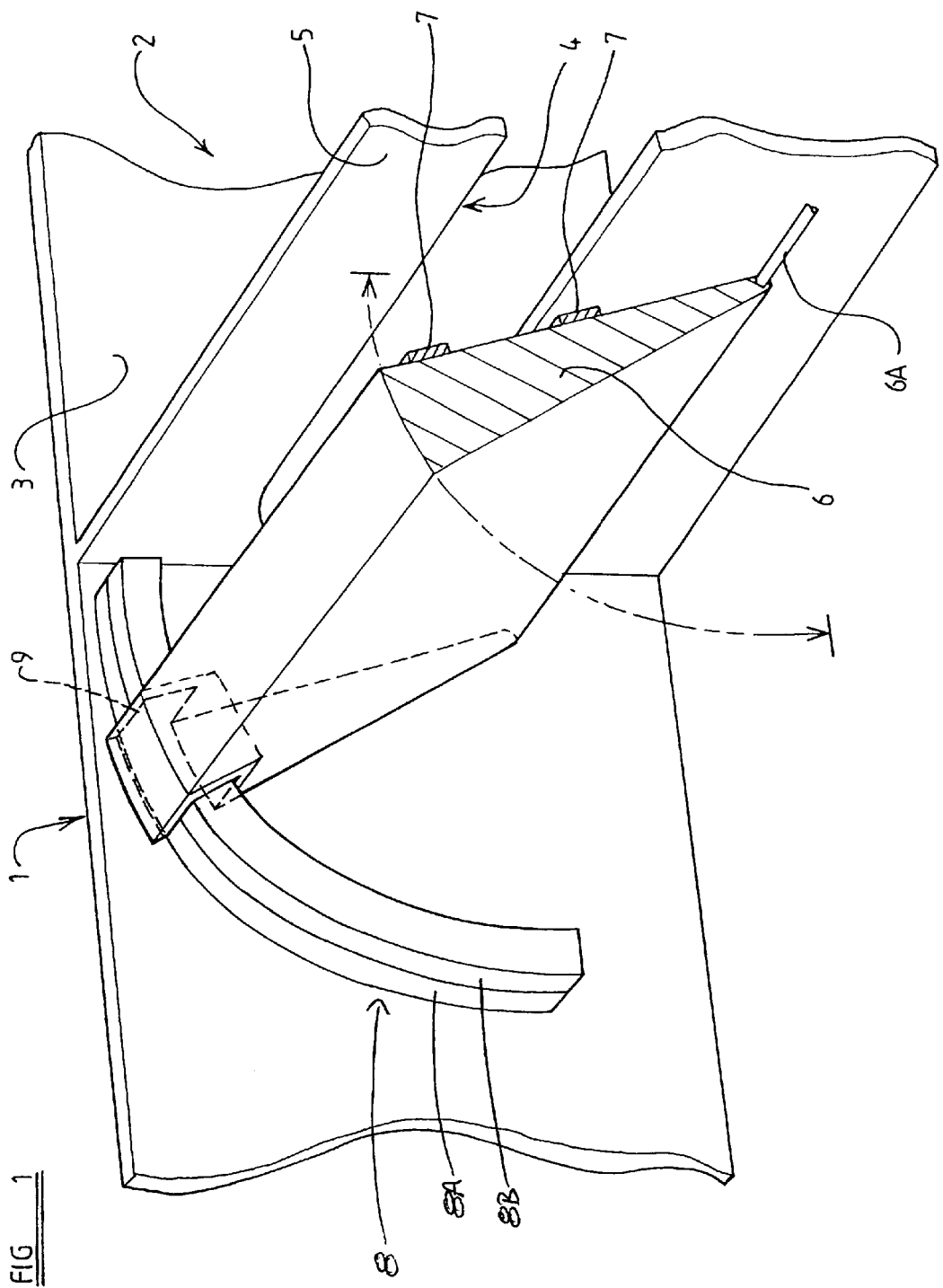
FIG. 1 is a schematic perspective view of a valve system incorporating an actuator embodying the present invention, parts of the valve system being shown in cutaway and parts of the actuator being shown in phantom.

Referring to FIG. 1, an actuator 1 embodying the present invention is shown attached to an air conduit system 2. The air conduit system 2 is purely an illustration to show one use for the actuator of the present invention. Air flows along conduit 3 and through an aperture 4 formed in a damper wall 5. A valve plate 6 is pivotally mounted to the conduit 3 on the downstream side of the damper wall 5 by a shaft 6A.

The valve plate 6 is movable between a fully open position which allows the free flow of air through the aperture 4 and a fully closed position in which the valve plate 6 is sealed to the aperture 4 by a seal 7 provided on the valve plate 6.

The actuator comprises two main parts, a stator 8 and a rotor 9. The stator 8 is mounted on a fixed platform comprising a side wall of the conduit 3. The rotor 9 is formed as part of the valve plate 6, i.e. the element to be rotatably actuated. Preferably, the stator 8 is integrated in the conduit wall structure. The stator 8 and rotor 9 are only shown schematically in FIG. 1 and are described in greater detail below.

The stator 8 defines the predetermined limited angle through which the element to be rotated, the valve plate 6 in this example, may be rotated. Thus, the stator 8 has a predetermined length and a predetermined radius. In the example shown in FIG. 1, the limited angle through which the valve plate 6 is rotatable is substantially 90 degrees.

Figure 2:
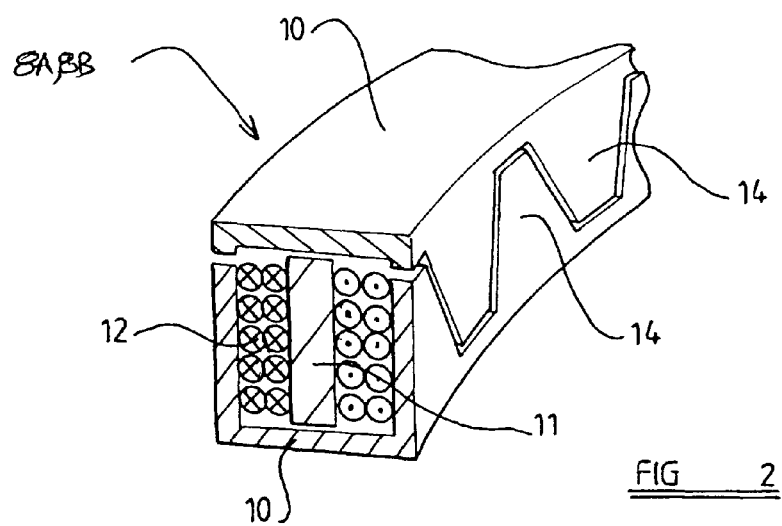
FIG. 2 is a perspective cross-sectional view of a mid-section of a stator for use with the actuator of FIG. 1.

The stator 8 is manufactured as a pair of stators 8A, 8B only one of which is shown in FIG. 2. Each stator 8 comprises four parts: two stator plates 10 formed from plates of electrical steel to provide a housing for the stator and to provide the stator magnetic poles; a rectangular arcuate core 11; and a winding 12.

Figure 3:
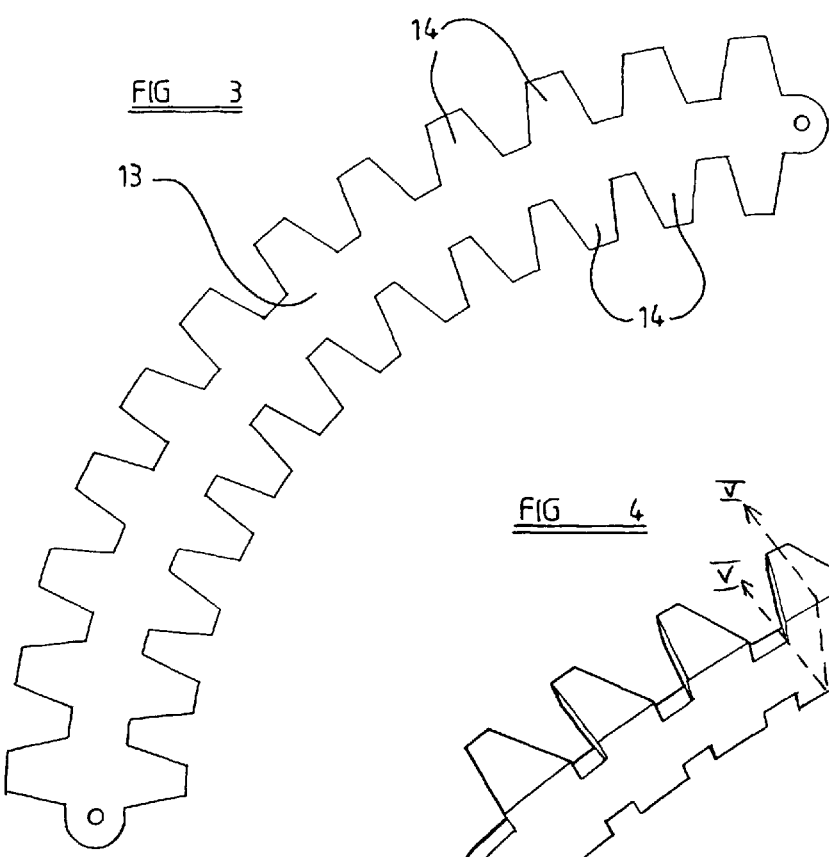
FIG. 3 is a plan view of a stator part for use with the actuator of FIG. 1.
Figure 4:
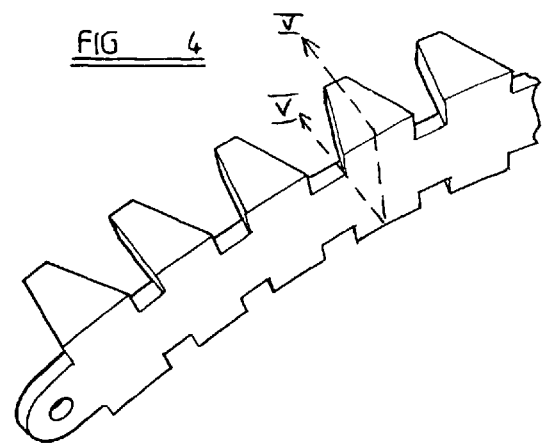
FIG. 4 is a perspective view of the stator part of FIG. 3 after a folding step.
Figure 5:
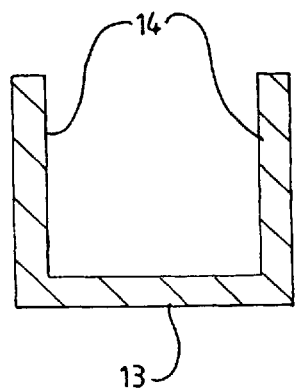
FIG. 5 is a cross-section through the stator part of FIG. 4 along line V—V.

Turning firstly to the stator plates 10, an example of one of these is shown in FIGS. 3, 4 and 5. Each stator plate 10 comprises an arcuate strip 13 formed with teeth 14 projecting radially from both the inner radius of the strip 13 and the outer radius of the strip. The teeth 14 are evenly spaced along the arcuate length of the strip 13. The pitch of the teeth in the assembled double stator is twice the step angle. In order to maintain the same number of teeth 14 on the inner radius of each stator plate 10 as there are on the outer radius, it is necessary for the teeth on the inner radius to be slightly narrower than the teeth on the outer radius and likewise for the gap between the teeth on the inner radius to be slightly smaller than the gap between the teeth on the outer radius.

As shown in FIG. 4, the teeth 14 are all folded so as to lie at 90 degrees to the plane of the plate 13 thereby defining an arcuate channel having a C-shaped section as shown in FIG. 5 which is a section along the line V—V through FIG. 4. Two stator plates 10 formed as described above can therefore be interlocked with one another as shown in FIG. 2 to form an enclosed channel of rectangular section.

The core 11 is elongate and arcuate so as to conform to the arcuate profile of the stator plates 10. The core is wound with numerous turns of wire 12 to produce a wound core which is inserted in the C-section of one of the stator plates 10. The other stator plate 10 is interlocked with the first stator plate 10 to sandwich the wound core 11, 12 between the plates.

The two pairs of interlocked teeth on the inner radius and outer radius of the stator 8 comprise two sets of poles for the stator 8.

Figure 6:
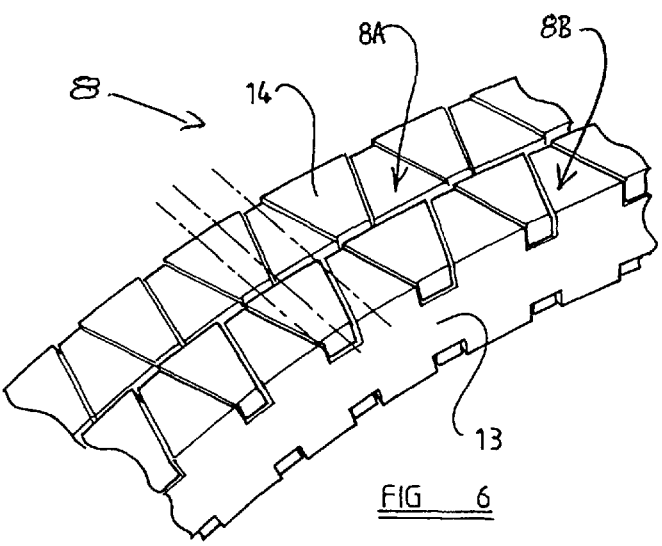
FIG. 6 is a partial perspective view of a mid-section of two stator parts shown in FIG. 4 interlocked with one another.

Two such stators 8A, 8B which are substantially identical to one another are fixed adjacent one another as shown in FIG. 6 to provide a double stator assembly in the form of an arc. The two stators 8A, 8B are staggered or displaced circumferentially with respect to one another by half of one pole pitch as shown in FIG. 6 by the phantom center lines, the two outer center lines being along the centers of two teeth 14 in one stator 8A and the inner center line being along the center of one tooth 14 in the other stator 8B.

The winding 12 within the stators 8A, 8B is controllably energized to provide alternating north and south poles in accordance with a conventional 2 or 4 phase energization sequence.

Figure 7:
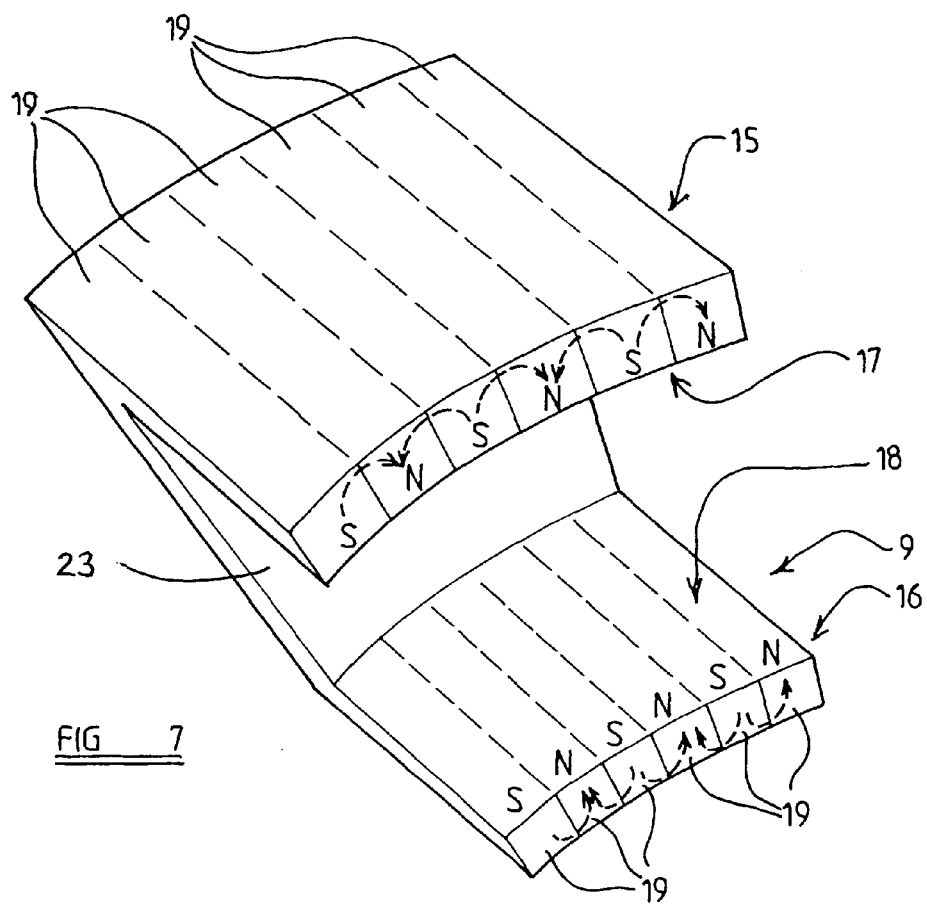
FIG. 7 is a perspective view of a rotor for use with the actuator of FIG. 1.

Turning now to the rotor 9 which is shown in isolation in FIG. 7, the rotor 9 comprises a pair of spaced apart permanent magnet blocks 15, 16 which are linked by a non-magnetic plate 23 to form a C-section.

The magnetic blocks 15, 16 each comprise an individual rotor. The blocks 15, 16 are spaced apart by a distance which is slightly greater than the radial depth of the stator 8. Thus, an upper block 15 fits alongside the outer radius of the stator 8 and a lower block 16 fits alongside the inner radius of the stator 8 thereby sandwiching the stator 8 between the two blocks 15, 16. The lower surface 17 of the upper block 15 and the upper surface 18 of the lower block 16 conform to the radius of the stator 8 so that any air gaps between the stator 8 and rotor 9 are minimized, thereby avoiding any unnecessary loss of magnetic flux between the stator 8 and the rotor 9.

The inner surfaces 17, 18 of the rotor 9 radially adjacent the stator 8 are magnetized into strips 19 of alternate magnetic polarity, i.e. north and south poles. Each pole of the rotor 9 runs across the width of the rotor 9. It should be noted that the width of the rotor 9 is slightly narrower than the combined length of the teeth 14 (of the poles of the stator 8) so that, when the actuator is assembled, the ends of the stator poles protrude slightly past the edges of the rotor. The converse arrangement is also possible.

As shown in FIG. 1, the rotor 9 is formed as part of the element to be moved, i.e. as part of the valve plate 6. Preferably, for torque considerations, the rotor 9 is formed at a location which is most distant from the center of rotation of the element to be rotated (the valve plate 6) so as to provide the greatest moment arm thereby reducing the force requirements of the actuator 1.

The provision of a rotor 9 having two parts 15, 16 which couple with the stator poles on respective inner and outer radii of the stator 8 provides two advantages. Firstly, the torque of the actuator is doubled due to the coupling doubling between the two rotor parts 15, 16 and the stator. Secondly, the magnetic thrust experienced between the rotor and the stator is substantially canceled out since substantially opposite thrusts are experienced by the two rotor parts 15, 16. Thus, the only resultant force experienced by the rotor 9 is substantially radial, as required.

As previously described, the poles of the stator 8 (which comprises a double stator assembly 8A, 8B) are formed along the inner and outer radii of the stator 8 so as to allow the poles of the rotor 9 to couple with the stator poles on both the inner radius and outer radius of the stator. The stator 8 and rotor 9 are adapted to co-operate with one another, the top surface 18 of the lower rotor 16 being located immediately radially adjacent the inner radius of the stator 8 and the lower surface 17 of the upper rotor 15 being located immediately radially adjacent the outer radius of the stator 8. The strips 19 of the rotor poles being substantially parallel to the teeth 14 (stator poles) on the stator 8.

The resultant actuator 1, shown in FIG. 1 as part of a valve system 2, is therefore configured to operate as a stepper motor, the basic step of the motor being defined by the pitch of the stator poles 14 and rotor magnetic pole pitch. Thus, accurate control of the element to be rotated can be effected by sequential energization of the winding 12.

A stepper motor driver circuit (not shown) is required to complete the actuator to allow controllable energization of the stator winding. The provisions of such a circuit falls well within the capabilities of a person of ordinary skill in the art of stepper motors. Likewise, variations on the particular configurations of the rotor, the stator, the operation of the actuator and the energization sequence for the winding are also well within the capabilities of a person of ordinary skill in the art of stepper motors.

It should be appreciated that the actuator of the present invention is not limited in its application to valve systems but is also of use in general engineering applications where precise rotary control over a limited angle is required.

Figure 8:
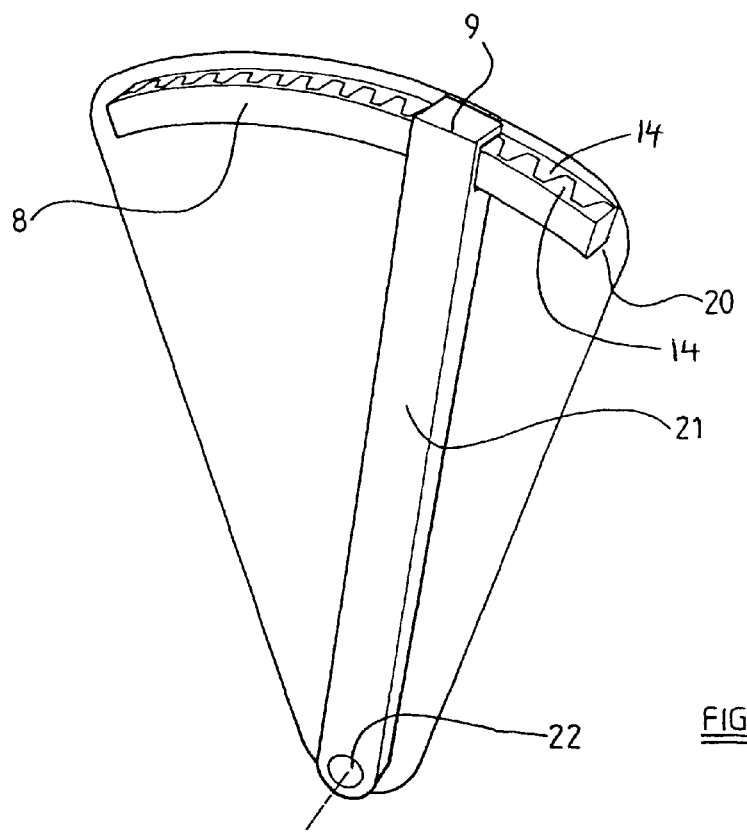
FIG. 8 is a schematic perspective view of an actuator embodying the present invention.

In FIG. 1, the actuator is shown as being built into the valve and housing assembly. The actuator can, however, be provided as a stand alone unit in its own housing as shown in FIG. 8. Only a back plate 20 of the housing is shown in FIG. 8. The basic elements of the actuator are identical to those in the previously described embodiment. The stator 8 is fixed to the housing back plate 20. The rotor 9 is mounted at one end of an elongate arm 21. The other end of the arm 21 carries a shaft 22. The shaft 22 is located at the center of rotation defined by the radius of the stator 8. Actuation of the rotor 9 around the stator 8 causes angular movement of the arm 21 and thence rotation of the shaft 22. Rotation of the shaft 22 is limited to the angle defined by the stator 8. The housing can be hermetically sealed to prevent the ingress of dust or other contaminants.

Whilst the stator is described as a double stator assembly, only a single stator is required. The rotor 9 need not be in the form of a pair of rotors 15, 16 but could comprise just a single rotor block. The rotor block could be located radially adjacent either the inner radius or the outer radius of the stator 8.

The use of a C-section rotor or other form of rotor which serves to sandwich the stator between two rotors (or two parts 15, 16 of the rotor 9) is not restricted to the limited angle rotary actuator described above but can also be used in motors of a more conventional design.

Figure 9:
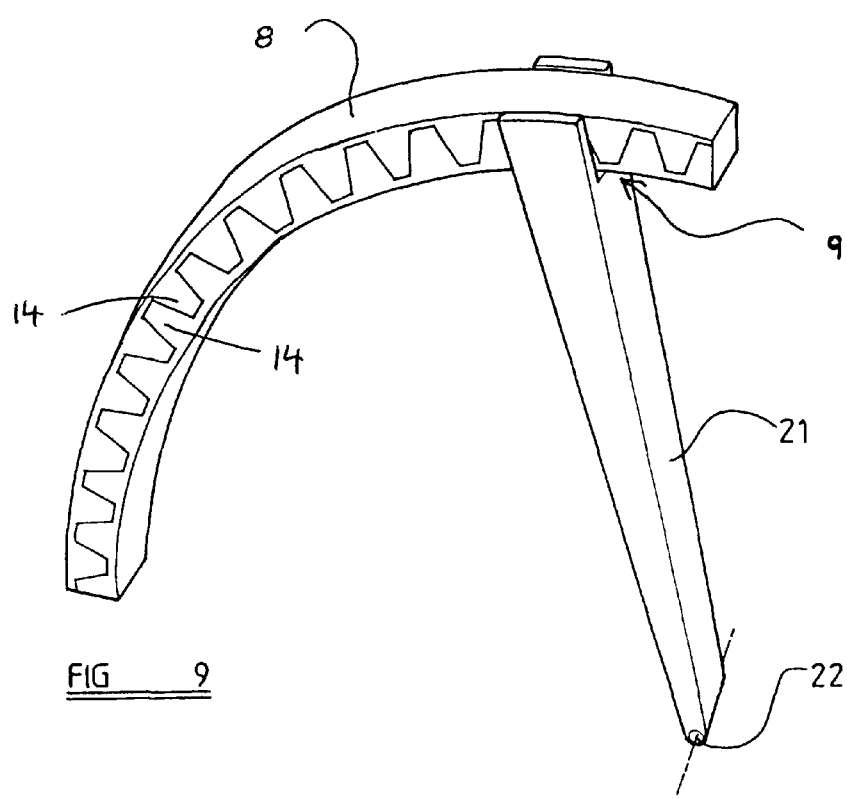
FIG. 9 is a schematic perspective view of another actuator embodying the present invention.

In a variation on the embodiments described above in which the magnetic fields coupling the rotor 9 and stator 8 together are substantially radially oriented (with respect to the stator radius), embodiments may also be configured in which the coupling magnetic fields are oriented normal to both the radial and tangential directions (with respect to the stator radius). A schematic example of such a configuration is shown in FIG. 9, the stator poles being located on the sides of the stator 8 parallel to the radial direction. In this example, the rotor parts 15, 16 of the rotor 9 need not be radiused as required in the embodiment shown in FIG. 7.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

I claim:

1. A rotary actuator comprising:
   a C-shaped rotor mounted on an element to be rotated at a position remote from the center of rotation of the element, the C-shaped rotor comprising a first rotor portion and a second rotor portion, said first and said second rotor portions further comprising a number of magnetic poles;
   an arcuate stator mounted on a platform, the stator being of predetermined length and having a predetermined radius so as to define a limited angle of rotation, the stator including a first stator and a second stator staggered circumferentially with respect to one another by half of one pole pitch, the stator having a plurality of poles along its arcuate length which are controllably energizable to alternate their polarity; and
   the magnetic poles of the rotor portions are disposed adjacent the energizable poles of the stator such that when energized the poles of the stator drive the C-shaped rotor, wherein the C-shaped rotor overlaps the first stator and the second stator.

2. An actuator according to claim 1, wherein the stator is located between the two rotor portions.

3. An actuator according to claim 2, wherein each of said two rotor portions comprises a permanent magnet which is magnetized into strips of poles of alternate magnetic polarity.

4. An actuator according to claim 2, wherein each of said two rotor portions comprises a plurality of discrete permanent magnets having poles of alternate magnetic polarity.

5. An actuator according to claim 2, wherein the stator is energizable to provide alternating poles in accordance with a conventional 2 or 4 phase energization sequence.

6. An actuator according to claim 2, wherein the pitch of the poles of each of said two rotor portions is defined by a desired step angle.

7. An actuator according to claim 2, wherein the stator has a first set of poles on its inner radius and a second set of poles on its outer radius.

8. An actuator according to claim 7, wherein the poles of each of said two rotor portions are located radially adjacent the poles of the stator, the profiles of the stator and the adjacent surface of each of said two rotor portions conforming with one another to minimize any air gap.

9. An actuator according to claim 2, wherein the stator has a first set of poles on one side of the stator, which side extends between the stator inner radius and the stator outer radius, and a second set of poles on an opposite side of the stator, which side extends between the stator inner radius and the stator outer radius.

10. An actuator according to claim 9, wherein the poles of a respective rotor portion are located immediately adjacent the sides of the stator carrying the stator poles, the profiles of the sides of the stator and the adjacent surface of said respective rotor portion conforming with one another to minimize any air gap.

11. An actuator according to claim 1, wherein the stator comprises an arcuate core provided with a winding and sandwiched between two arcuate stator plates carrying the stator poles.

12. An actuator according to claim 1, wherein the platform is a back plate.

13. A rotary actuator comprising:
   a C-shaped rotor mounted on an element to be rotated, the C-shaped rotor comprising a first rotor portion and a second rotor portion, each provided with a number of magnetic poles; and
   an arcuate stator mounted on a platform, the stator including a first stator and a second stator staggered circumferentially with respect to one another by half of one pole pitch, the stator having a plurality of poles along its arcuate length which are controllably energizable to alternate their polarity and drive the C-shaped rotor, wherein the C-shaped rotor overlaps the first stator and the second stator, wherein the stator is located between the first and the second rotor portions and the stator poles on one side of the stator are adjacent the poles of the first rotor portion and the stator poles on the other side of the stator are adjacent the poles of the second rotor portion.

14. An actuator according to claim 13, wherein each of said two rotor portions comprises a permanent magnet which is magnetized into strips of poles of alternate magnetic polarity.

15. An actuator according to claim 13, wherein each of said two rotor portions comprises a plurality of discrete permanent magnets having poles of alternate magnetic polarity.

16. An actuator according to claim 13, wherein each of said two rotor portions is part of an element to be rotated and is located at a position remote from the center of rotation of the element.

17. An actuator according claim 13, wherein the stator is energizable to provide alternating poles in accordance with a conventional 2 or 4 phase energization sequence.

18. An actuator according to claim 13, wherein the pitch of the poles of each of said two rotor portions is defined by a desired step angle.

19. An actuator according to claim 13, wherein the stator has a first set of poles on its inner radius and a second set of poles on its outer radius.

20. An actuator according to claim 19, wherein the poles of each of said two rotor portions are located radially adjacent the poles of the stator, the profiles of the stator and the adjacent surface of each of said two rotor portions conforming with one another to minimize any air gap.

21. An actuator according to claim 13, wherein the stator has a first set of poles on one side of the stator, which side extends between the stator inner radius and the stator outer radius, and a second set of poles on an opposite side of the stator, which side extends between the stator inner radius and the stator outer radius.

22. An actuator according to claim 19, wherein the poles of a respective rotor portion are located immediately adjacent the sides of the stator carrying the stator poles, the profiles of the sides of the stator and the adjacent surface of said respective rotor portion conforming with one another to minimize any air gap.

23. An actuator according to claim 13, wherein the stator comprises an arcuate core provided with a winding and sandwiched between two arcuate stator plates carrying the stator poles.

* * * * *